(12) United States Patent
Chen et al.

(10) Patent No.: US 7,514,523 B2
(45) Date of Patent: Apr. 7, 2009

(54) POLYCARBONATE COMPOSITIONS AND ARTICLES FORMED THEREFROM, WITH MATTE SURFACES AND HIGH LIGHT TRANSMISSIONS

(75) Inventors: Jing Chen, MinHang District (CN); Theodorus Lambertus Hoeks, Bergen op Zoom (NL); Kazushige Inoue, Moka (JP); Dake Shen, Pudong District (CN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 316 days.

(21) Appl. No.: 11/325,867

(22) Filed: Jan. 5, 2006

(65) Prior Publication Data

US 2007/0155914 A1 Jul. 5, 2007

(51) Int. Cl.
*C08G 64/00* (2006.01)
*C08F 63/02* (2006.01)

(52) U.S. Cl. .................... 528/196; 428/411.1; 428/412; 525/461; 528/198

(58) Field of Classification Search ............. 264/176.1, 264/219; 525/55, 461; 528/196, 198; 428/411.1, 428/412
See application file for complete search history.

(56) References Cited

U.S. PATENT DOCUMENTS 3,775,367 A    11/1973  Krefeld
3,880,783 A    4/1975   Serini et al.
3,971,756 A    7/1976   Bialous et al.
4,028,297 A    6/1977   Webb
4,110,299 A    8/1978   Mark
4,130,530 A    12/1978  Mark et al.
4,303,575 A    12/1981  Reinert
4,335,038 A    6/1982   Thomas
4,552,911 A    11/1985  Cohnen et al.
4,916,194 A    4/1990   Policastro et al.
5,188,777 A *  2/1993   Joesten et al. .................. 264/41
5,218,027 A    6/1993   Smith et al.
5,508,323 A    4/1996   Romenesko et al.
5,849,822 A    12/1998  Kido et al.
6,306,976 B1 * 10/2001  Matsuda et al. ............. 525/316
6,559,270 B1   5/2003   Siclovan et al.
7,169,859 B2 * 1/2007   Davis et al. .................. 525/437
2003/0032723 A1 * 2/2003 Weber et al. .................. 525/55

FOREIGN PATENT DOCUMENTS

EP    0 054 497 B1    4/1985
EP    0 922 722 A1    11/1998
EP    0 730 624 B1    12/1999

OTHER PUBLICATIONS

PCT International Search Report for International Application No. PCT/US2006/048596.

* cited by examiner

*Primary Examiner*—Terressa M Boykin

(57) ABSTRACT

A composition is disclosed having a matte surface and high optical transmission characteristics. The composition comprises a polycarbonate and refractive index compatible polymer particles such as crosslinked polystyrene. The polycarbonate composition is useful for manufacture of anti-glare lenses, ATM screens, decorative articles, and housings for electronic appliances such as a computer.

21 Claims, No Drawings

POLYCARBONATE COMPOSITIONS AND ARTICLES FORMED THEREFROM, WITH MATTE SURFACES AND HIGH LIGHT TRANSMISSIONS

BACKGROUND

This disclosure relates to polycarbonate compositions and articles formed from such compositions that exhibit a matte, or non gloss or luster, surface appearance and high light transmission, as well as uses thereof.

Polycarbonates (PC) have excellent mechanical properties including impact resistance, thermal stability such as heat resistance, and optical properties such as transparency, among others. These materials are therefore widely used in various applications such as in mechanical or structural parts, and automobile components, as well as optical applications, such as lenses, optical memory disks, and optical fibers, etc.

However, articles made with polycarbonates generally exhibit high gloss or luster, which is not desirable for applications such as anti-glare lenses, ATM screens, decorative articles, and housings for electronic appliances such as computers. As a result, transparent polycarbonate resins that can readily be formed with matte, low gloss and/or shine surface appearances are needed.

Since matting agents, such as inorganic fillers and rubbers, cause polycarbonates to be opaque, the most widely used technologies to produce a matte surface include textured molds and matte coatings. However, textured molding methods need special mold modifications, and, after articles are released from such a mold, the relatively hot surfaces tend to relax and reduce the surface roughness of the resulting article, thereby increasing its gloss. Furthermore, matte coating is not only less cost-effective, but also undesirable for the purposes of environment protection.

EP0730624 discloses a low gloss transparent PC. In that document, a high molecular weight branched PC (Mw above 99,100) is mixed with linear PC. The blends exhibit a good combination of physical properties, thermal stability, color, melt strength, transparency and matte surface. However, the high viscosity of branched PC poses a problem for molding operations.

In EP054497, a polycarbonate with a reactive end group sealer is blended with a radical initiator and normal linear PC. Lower gloss and relatively high light transmission (around 84%) are achieved through this reactive extrusion process. However, reactive extrusion processes result generally in poor consistency, and reduced production output. Moreover, the light transmission of the product is usually not very satisfactory.

There accordingly remains a need in the art for polycarbonate compositions that can readily produce an article with a matte surface and high light transmission, which is also thermally stable, cost-effective, and have good manufacturability characteristics, among others.

SUMMARY

One aspect of the present disclosure provides a composition, such as a thermoplastic composition, that exhibits a matte or non-shiny surface and high light transmission, which comprises (i) a polycarbonate with a refractive index $\alpha$; and (ii) polymer particles with a refractive index $\beta$; in which $\beta$ is within the range of about $0.98\alpha$ to about $1.02\alpha$. For example, the polymer particles may be crosslinked polystyrene.

In another aspect, the present disclosure provides an article manufactured from the noted thermoplastic composition, such as an anti-glare lens, an ATM screen, a decorative article, or a housing for an electronic appliance.

The above described and other features are exemplified by the following detailed description.

DETAILED DESCRIPTION

Disclosed herein is a polycarbonate composition, which comprises polymer particles with a compatible refractive index, e.g. crosslinked polystyrene particles. The polycarbonate composition exhibits particular desirable properties such as a matte surface, high light transmission characteristics, thermal stability, cost-effectiveness, enhanced hardness, and good manufacturability, among others.

The compositions described herein exhibit a unique matte finish when formed into articles. The matte finish is generally a non-shiny or low gloss surface in appearance. Generally, the term "matte surface or finish" as used herein refers to a non-shiny, flat, low luster, frosted, or low gloss surface. The compositions of the present disclosure surprisingly exhibit such a matte surface characteristic, while also exhibiting relatively high light or optical transmission characteristics.

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "aromatic radical" refers to a radical having a valence of at least one comprising at least one aromatic group; Examples of aromatic radicals include phenyl, pyridyl, furanyl, thienyl, naphthyl, and the like; "arylene" refers to a benzene ring diradical or to a benzene ring system diradical fused to at least one optionally substituted benzene rings; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; the modifier "about" used in connection with a quantity is inclusive of the stated value and has the meaning dictated by the context (e.g., includes the degree of error associated with measurement of the particular quantity); "optional" or "optionally" means that the subsequently described event or circumstance may or may not occur, and that the description includes instances where the event occurs and instances where it does not; and "direct bond", where part of a structural variable specification, refers to the direct joining of the substituents preceding and succeeding the variable taken as a "direct bond".

Compounds are described herein using standard nomenclature. A dash ("—") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

In one embodiment, the disclosure provides a composition, such as a thermoplastic composition, comprising:
(i) a polycarbonate with a refractive index α; and
(ii) polymer particles with a refractive index β;
in which β is within the range of from about 0.98α to about 1.02α. Specifically, β, can be within the range of from about 0.99α to about 1.01α; and more specifically, β can be within the range of from about 0.995α to about 1.005α.

In another embodiment, the polymer particles with a refractive index β function as a matting agent and comprise a copolymer of mono-vinyl aromatic monomers and multiple-vinyl aromatic monomers. In a specific embodiment, the polymer particles comprise a polymer of mono-vinyl aromatic monomers, which are crosslinked with multiple-vinyl aromatic monomers.

Any compound that comprises one vinyl group and an aromatic group may be used as the mono-vinyl aromatic monomer. Suitable mono-vinyl aromatic monomers include, but are not limited to styrene, ethylvinylbenzene, α-methylstyrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than about 18; and mixtures thereof. In exemplified embodiments, the mono-vinyl aromatic monomer comprises styrene or ethylvinylbenzene or mixture thereof.

Any compound that comprises two or more vinyl groups and an aromatic group may be used as the multiple-vinyl aromatic monomer. Suitable multiple-vinyl aromatic monomers include, but are not limited to compounds with a general formula as shown below:

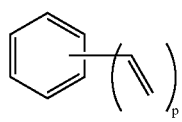

in which p is an integer and 2≦p≦6, preferably, p is 2 or 3, more preferably p is 2, i.e. di-vinyl-benzene (DVB).

In one embodiment, the DVB may be selected from any one of the following isomers or any combination thereof:

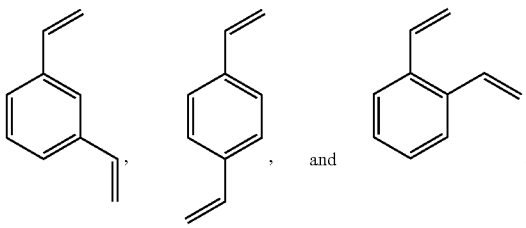

In a further embodiment, the loading ratio (%) of multiple-vinyl aromatic monomers such as DVB is defined according to the following formula:

$$\text{loading ratio} = \frac{x}{y} \times 100\%$$

in which x is the total weight of multiple-vinyl aromatic monomers in the particles and y is the total weight of mono-vinyl aromatic monomers in the particles.

In one embodiment, the loading ratio may broadly range from about 1% to about 50%, specifically from about 2% to about 20%, and more specifically from about 2.5% to about 10%.

In another embodiment, crosslinked polystyrene (X-PS) is used to blend with polycarbonate. X-PS may be obtained from various commercial sources, or may be prepared by a skilled person in the art, for example, by utilizing suspension polymerization with poly vinyl alcohol as a separation agent. Divinyl benzene (DVB) may be added as the crosslinking agent, and the loading ratio could change from 2.5% to 50%.

In a further embodiment, the polymer particles such as X-PS will be dispersed in the matrix. The average mean diameter of such particles may be modulated in a general range of from about 2 microns to about 1000 microns, specifically from about 4 microns to about 700 microns, and more specifically from about 6 microns to 300 microns.

Polymer particles such as X-PS can be used in amounts of from about 0.5% to about 50% by weight, specifically from about 1.5% to about 40% by weight, and more specifically from about 2.5% to about 20% by weight, based on the weight of the polycarbonate in the composition.

The polycarbonate of the disclosure can comprise repeating structural carbonate units of the formula (1):

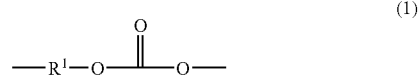
(1)

in which $R^1$ group may be selected from any aromatic radicals, alicyclic radicals, and aliphatic radicals. In an embodiment, at least 60% of the $R^1$ groups are aromatic organic radicals.

In a further embodiment, $R^1$ is an aromatic organic radical, for example a radical of the formula (2):

$$-A^1-Y^1-A^2-\qquad(2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

In another embodiment, the polycarbonate can comprise repeating structural carbonate units of the formula (A-1):

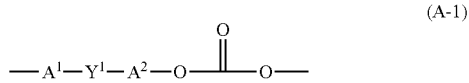
(A-1)

wherein Y$^1$, A$^1$ and A$^2$ are as described above.

In yet another embodiment, polycarbonates may be produced via the interfacial reaction of dihydroxy compounds having the formula HO—R$^1$—OH, which includes dihydroxy compounds of formula (3):

HO-A$^1$-Y$^1$-A$^2$-OH (3)

wherein Y$^1$, A$^1$ and A$^2$ are as described above.

In still another embodiment, polycarbonates may be produced via the interfacial reaction of bisphenol compounds of general formula (4):

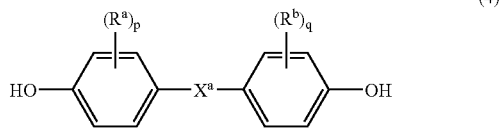
(4)

wherein R$^a$ and R$^b$ each represent a halogen atom or a monovalent hydrocarbon group and may be the same or different; p and q are each independently integers of 0 to 4; and X$^a$ represents one of the groups of formula (5):

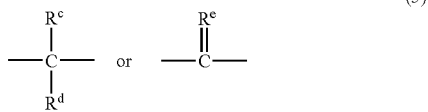
(5)

wherein R$^c$ and R$^d$ each independently represent a hydrogen atom or a monovalent linear or cyclic hydrocarbon group and R$^e$ is a divalent hydrocarbon group.

In yet a further embodiment, polycarbonates may be produced via the interfacial reaction of one or more bisphenol compounds of general formula (B-1):

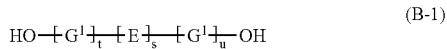
(B-1)

wherein each G$^1$ is independently at each occurrence a C$_6$-C$_{20}$ aromatic radical; E is independently at each occurrence a bond, a C$_3$-C$_{20}$ cycloaliphatic radical, a C$_3$-C$_{20}$ aromatic radical, a C$_1$-C$_{20}$ aliphatic radical, a sulfur-containing linkage, a selenium-containing linkage, a phosphorus-containing linkage, or an oxygen atom; "t" is a number greater than or equal to one; "s" is either zero or one; and "u" is a whole number including zero.

Some illustrative, non-limiting examples of suitable dihydroxy compounds include the following: resorcinol; C$_{1-3}$ alkyl-substituted resorcinols; 4-bromoresorcinol, hydroquinone, 4,4'-dihydroxybiphenyl, 1,6-dihydroxynaphthalene, 2,6-dihydroxynaphthalene, 1,1-bis(4-hydroxyphenyl) cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)] benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 1,1-bis(4-hydroxyphenyl)-1-cyanoethane; 1,1-bis(4-hydroxyphenyl) dicyanomethane; 1,1-bis(4-hydroxyphenyl)-1-cyano-1-phenylmethane; 2,2-bis(3-methyl-4-hydroxyphenyl) propane; 1,1-bis(4-hydroxyphenyl)norbornane; 3,3-bis(4-hydroxyphenyl)phthalide; 1,2-bis(4-hydroxyphenyl)ethane; 1,3-bis(4-hydroxyphenyl)propenone; bis(4-hydroxyphenyl) sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl) propane(bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl) propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl) cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3- methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)-4-methylcyclohexyl]-1-methyl-ethyl]-phenol (2,8 BHPM); 3,8-dihydroxy-5a, 10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl) cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl) cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; bis(4-hydroxyphenyl) acetonitrile; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethyl-spiro(bis)indane ("spirobiindane bisphenol"); 3,3-bis(4-hydroxyphenyl)phthalide; 2,6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene; 2,7-dihydroxycarbazole, and the like, as well as combinations comprising at least one of the foregoing dihydroxy compounds.

Specific examples of the types of bisphenol compounds represented by formula (4) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), 1,1-bis(4-hydroxyphenyl)-3,3,5-trimethylcyclohexane (BPI), and 1,1-bis(4-hydroxy-3-methylphenyl)cyclohexane (DMBPC). Combinations comprising at least one of the foregoing dihydroxy compounds may also be used.

In one embodiment, the polycarbonate can comprise repeating structural carbonate units of the formula (A-2):

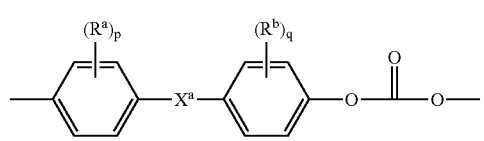

(A-2)

wherein p, q, $R^a$, $R^b$ and $X^a$ are as described above.

In another embodiment, the polycarbonate can comprise repeating structural carbonate units of the formula (A-3), i.e. BPA unit:

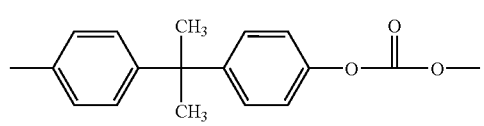

(A-3)

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of 0.05 to 2.0 wt % of the polycarbonate. All types of polycarbonate end groups are contemplated as being useful in the polycarbonate, provided that such end groups do not significantly affect desired properties of the polycarbonate product.

The polycarbonates may have a weight average molecular weight (Mw) of from about 1500 to about 100,000, including from about 5000 to about 50,000, and most specifically from about 10,000 to about 30,000, as measured by gel permeation chromatography (GPC) using a crosslinked styrene-divinyl benzene column, at a sample concentration of 1 milligram per milliliter, and as calibrated with polycarbonate standards.

The polycarbonates readily form surfaces that exhibit a luster finish. The luster finish can be quantified according to Gloss measurement, and generally has a value of 100-180, including 120-170, and most specifically a value of 140-165.

The polycarbonate may have a light transmittance greater than or equal to 65%, specifically greater than or equal to 75% and more specifically greater than or equal to 85%, as measured at 3.18 millimeters thickness according to ASTM D1003-00. The polycarbonate may also have a haze less than or equal to 50%, specifically less than or equal to 40%, and most specifically less than or equal to 30%, as measured at 3.18 millimeters thickness according to ASTM D1003-00.

In an embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles may have an MVR, measured at 300° C./1.2 kg according to ASTM D1238-04, of 0.5 to 80 cubic centimeters per 10 minutes (cc/10 min). In a specific embodiment, a suitable polycarbonate composition has an MVR measured at 300° C./1.2 kg according to ASTM D1238-04, of 0.5 to 50 cc/10 min, specifically 0.5 to 25 cc/10 min, and more specifically 1 to 15 cc/10 min. Mixtures of polycarbonates of different flow properties may be used to achieve the overall desired flow property.

Polycarbonates of the disclosure may include copolymers comprising carbonate chain units and other units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like. In one embodiment, polyester-polycarbonates contain repeating units of formula (6):

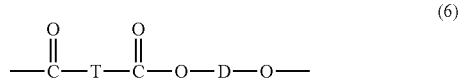

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

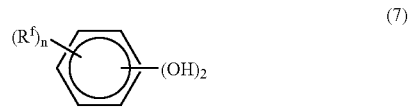

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In a further embodiment, carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. In case the polycarbonate comprises units derived from resorcinol and/or bisphenol A, the molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the ratio of polycarbonate to polyester-polycarbonate in the blend can be, respectively, 1:99 to 99:1, specifically 10:90 to 90:10.

In one embodiment, the polycarbonate of the disclosure can comprise both repeating structural carbonate units of the formula (A-3) (BPA unit) and repeating structural ester units of the formula (E-1), which may be any copolymer of BPA polycarbonate and resorcinol phthalate (ITR).

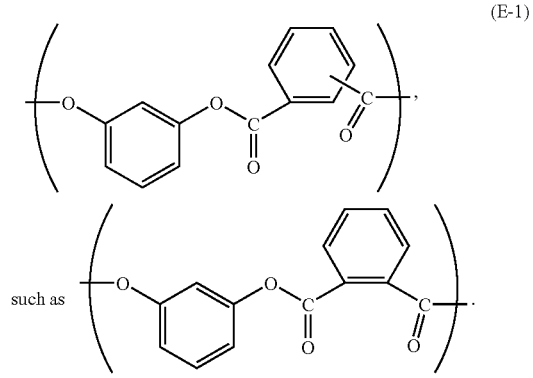

(E-1)

Such copolycarbonates may be synthesized by a skilled artisan, or can be obtained commercially, for example, GE Advanced Materials' LEXAN® SLX resin. LEXAN® SLX resin is ITR-polycarbonate copolymer with molecular weight 20,000-30,000, refractive index around 1.59-1.603. Further details of these materials can be found in U.S. Pat. No. 6,559,270, the disclosure of which is fully incorporated herein by reference.

The polyester-polycarbonates may have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 11. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

In one embodiment, the polyester-polycarbonates may be prepared by interfacial polymerization. Rather than utilizing a dicarboxylic acid, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. In one embodiment, an effective amount of a phase transfer catalyst may be 0.1 to 10 wt % based on the weight of bisphenol in the phosgenation mixture. In another embodiment, an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In addition to the polycarbonates, polyester-polycarbonates, and combinations of these as described above, it is also possible to use combinations of the polycarbonates and polyester-polycarbonates with other thermoplastic polymers, for example combinations of polycarbonates and/or polycarbonate copolymers with polyesters.

Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

An example of a useful class of polyester is the poly(alkylene terephthalate)s. Specific examples of poly(alkylene terephthalate)s include, but are not limited to, poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also useful are poly(cyclohexanedimethanol terephthalate)-co-poly(ethylene terephthalate), abbreviated as PETG wherein the polymer comprises greater than or equal to 50 mole % of poly(ethylene terephthalate), and abbreviated as PCTG, wherein the polymer comprises greater than 50 mole % of poly(cyclohexanedimethanol terephthalate). The above polyesters can include the analogous aliphatic polyesters such as poly(alkylene cyclohexanedicarboxylate), an example of which is poly(1,4-cyclohexylenedimethylene-1,4-cyclohexanedicarboxylate) (PCCD). Also contemplated are the above polyesters with a minor amount, e.g., from 0.5 to 10 percent by weight, of units derived from an aliphatic diacid and/or an aliphatic polyol to make copolyesters.

The copolycarbonate may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (8):

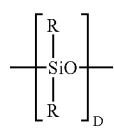

(8)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (9):

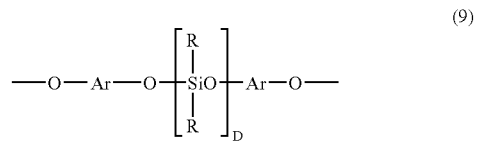

(9)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are. 1,1-bis(4-hydroxyphenyl)methane, 1,1-bis(4-hydroxyphenyl) ethane, 2,2-bis(4-hydroxyphenyl)propane, 2,2-bis(4-hydroxyphenyl)butane, 2,2-bis(4-hydroxyphenyl)octane, 1,1-bis(4-hydroxyphehyl)propane, 1,1-bis(4-hydroxyphenyl)n-butane, 2,2-bis(4-hydroxy-1-methylphenyl)propane, 1,1-bis (4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (9) may be derived from the corresponding dihydroxy compound of formula (10):

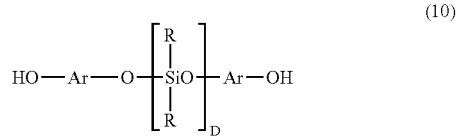

(10)

wherein R, Ar, and D are as described above. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (11):

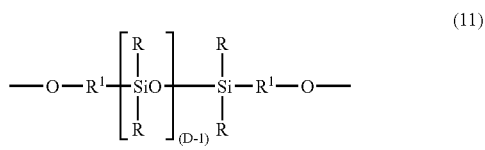

(11)

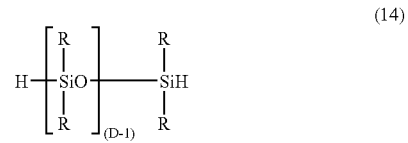

(14)

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

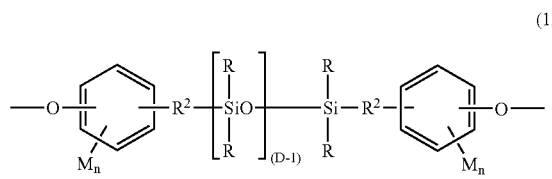

(12)

wherein R and D are as defined above. Each $R^2$ in formula (12) is independently a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

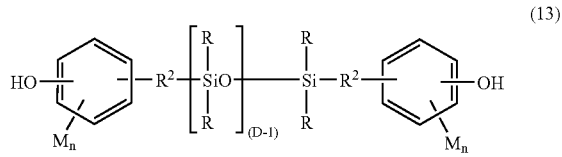

(13)

wherein R, D, M, $R^2$, and n are as described above. Such dihydroxy polysiloxanes can be made by effecting a platinum catalyzed addition between a siloxane hydride of formula (14):

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In another embodiment, the polysiloxane-polycarbonate may comprise 50 to 99 wt % of carbonate units and 1 to 50 wt % siloxane units. Within this range, the polysiloxane-polycarbonate copolymer may comprise 70 to 98 wt %, specifically 75 to 97 wt % of carbonate units and 2 to 30 wt %, specifically 3 to 25 wt % siloxane units.

In an embodiment, the polysiloxane-polycarbonate may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

As discussed above, articles made with polycarbonate generally exhibit high gloss, which is not desirable for such applications as anti-glare lens, ATM screens, and certain decorative articles. Polycarbonate resins that can form a matte surface may be prepared by using matting agents such as inorganic fillers and rubbers, but the resin becomes opaque. Textured molding methods need special mold modification, and, after articles are released from a mold, the relatively hot surface of the article will tend to relax and reduce the surface roughness. Matte coating is not only less cost-effective, but also undesirable for the purpose of environment protection. The present disclosure surprisingly provides a polycarbonate composition that exhibits a matte surface and yet high optical transmission.

Although not wishing to be bound to any particular theory, it is believed that the unique properties of exhibiting a matte finish while also exhibiting a relatively high light transmission are achieved as follows. As noted, in certain embodiments, the present development composition comprises (i) a polycarbonate having a first refractive index and (ii) polymer particles, such as for example, polystyrene, having a second refractive index. For example, since polystyrene has almost the same refractive index as polycarbonate (1.59 versus 1.586), the interface of polystyrene in polycarbonate matrix will not scatter the light, which enables the molded articles to exhibit a relatively high light transmission. At the same time, since the particles are crosslinked, the particle shape is maintained after molding, which thereby renders the surface matte. A possible mechanism is that the higher the DVB loading, the more rigid the particles become, thereby increasing the polystyrene's resistance to stretching or other deformation during processing of the composition. This retains or rather promotes surface roughness. Thus, a matte surface results. In one embodiment, it was also surprisingly found that X-PS helps to improve the anti-scratch characteristic of a copolymer of PC and ITR (Resorcinol Phthalate). Possibly, higher loading of DVB results in more rigid particles and better anti-scratch performance.

In one embodiment, the composition of the disclosure comprises (i) a polycarbonate with a refractive index α; (ii) polymer particles with a refractive index β; and (iii) one or more optional additives selected from the group consisting of hydrolysis stabilizer, impact modifier, filler/reinforcing agent, visual effect enhancer, antioxidant, heat stabilizer, light stabilizer, ultraviolet light absorber, plasticizer, mold release agent, lubricant, antistatic agent, pigment, dye, flame retardant, processing aid, radiation stabilizer, anti-drip agent; and combinations thereof. The refractive indices α and β are as previously described.

In various embodiments, additives ordinarily incorporated in the compositions are selected so as not to adversely affect the desired properties of the composition. Mixtures of additives may be used. Such additives may be mixed at a suitable time during the mixing of the components for forming the composition.

The composition of the disclosure may comprise one or more hydrolysis stabilizers for reducing hydrolysis of ester and/or carbonate groups. Typical hydrolysis stabilizers may include carbodiimide-based additives such as aromatic and/or cycloaliphatic monocarbo-diimides substituted in position 2 and 2', such as 2,2',6,6'-tetraisopropyidiphenylcarbodiimide. Polycarbodiimides having a molecular weight of over 500 grams per mole are also suitable. Other compounds useful as hydrolysis stabilizers include an epoxy modified acrylic oligomers or polymers, and oligomers based on cycloaliphatic epoxides. Specific examples of suitable epoxy functionalized stabilizers include Cycloaliphatic Epoxide Resin ERL-4221 supplied by Union Carbide Corporation (a subsidiary of Dow Chemical), Danbury, Conn.; and JONCRYL® ADR-4300 and JONCRYL® ADR-4368, available from Johnson Polymer Inc, Sturtevant, Wis. When present, hydrolysis stabilizers can be used in amounts of 0.05 to 1 percent by weight, specifically 0.1 to 0.5 percent by weight, and more specifically 0.12 to 0.3 percent by weight, based on the weight of the polycarbonate used in the thermoplastic composition.

The composition may comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. When present, pigments can be used in amounts of 0.01 to 10 percent by weight, based on the weight of the polycarbonate used in the thermoplastic composition.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. When present, dyes can be used in amounts of 0.01 to 10 percent by weight, based on the total weight of the polycarbonate used in the thermoplastic composition.

The composition may optionally comprise an impact modifier to increase its impact resistance, where the impact modifier is present in an amount that does not adversely affect the desired properties of the composition. These impact modifiers include elastomer-modified graft copolymers comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (15):

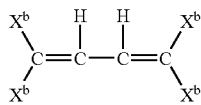

(15)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Vinyl aromatic compounds may be copolymerized with the ethylenically unsaturated nitrile monomer to forma a copolymer, wherein the vinylaromatic compounds can include monomers of formula (16):

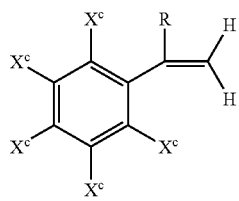

(16)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (17):

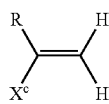

(17)

wherein R is hydrogen, $C_1$-$C_5$ alkyl, bromo, or chloro, and $X^c$ is $C_1$-$C_{12}$ alkoxycarbonyl, $C_1$-$C_{12}$ aryloxycarbonyl, hydroxy carbonyl, or the like. Examples of monomers of formula (17) include, acrylic acid, methyl(meth)acrylate, ethyl(meth)acrylate, n-butyl(meth)acrylate, t-butyl(meth)acrylate, n-propyl (meth)acrylate, isopropyl(meth)acrylate, 2-ethylhexyl(meth) acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl(meth)acrylate monomers may optionally be polymerized in admixture with up to 15 wt % of comonomers of formulas (15), (16), or (17). Exemplary comonomers include but are not limited to butadiene, isoprene, styrene, methyl methacrylate, phenyl methacrylate, penethylmethacrylate, N-cyclohexylacrylamide, vinyl methyl ether, and mixtures comprising at least one of the foregoing comonomers. Optionally, up to 5 wt % of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light transmittance methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70 wt %. Also suitable are mixtures of butadiene with styrene and/or $C_{4-6}$ alkyl acrylate rubbers.

The elastomeric phase may provide 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include, methyl (meth)acrylate, ethyl(meth)acrylate, n-propyl(meth)acrylate, isopropyl(meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, specifically 30 to 100 wt %, more specifically 50 to 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 wt % elastomer-modified graft copolymer and 5 to 65 wt % graft (co) polymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R_d$ is hydrogen or a $C_1$-$C_8$ linear or branched alkyl group and Re is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable, alkenyl-containing organic material may be, for example, a monomer of formula (16) or (17), e.g., styrene, alpha-methylstyrene, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl) (dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and tetraethoxyorthosilicate may be reacted with a first graft link monomer such as (gamma-methacryloxypropyl)methyldimethoxysilane, to afford silicone rubber having an average particle size from 100 nanometers to 2 micrometers. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

The foregoing types of impact modifiers, including SAN copolymers, can be prepared by an emulsion polymerization process that is free of basic materials such as alkali metal salts of $C_{6-30}$ fatty acids, for example sodium stearate, lithium stearate, sodium oleate, potassium oleate, and the like; alkali metal carbonates, amines such as dodecyl dimethyl amine, dodecyl amine, and the like; and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

When present, impact modifiers can be present in amounts of 0.1 to 30 percent by weight, based on the weight of the polycarbonate used in the composition.

The composition may include fillers or reinforcing agents. Where used, suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, finite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. When present, fillers can be used in amounts of 0 to 90 percent by weight, based on the weight of the polycarbonate used in the composition.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead. When present, visual effect enhancers can be used in amounts of 0.01 to 10 percent by weight, based on the weight of the polycarbonate used in the composition.

Suitable antioxidant additives include, for example, organophosphites such as tris(nonylphenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhyd rocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. When present, antioxidants can be used in amounts of 0.0001 to 1 percent by weight, based on the weight of the polycarbonate used in the composition.

Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. When present, heat stabilizers can be used in amounts of 0.0001 to 1 percent by weight, based on the weight of the polycarbonate used in the composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. When present, light stabilizers can be used in amounts of 0.0001 to 1 percent by weight, based on the weight of the polycarbonate used in the composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy] methyl]propane (UVINUL™ 3030); 2,2'-(1,4-phenylene)bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with a particle size less than 100 nanometers; or the like, or combinations comprising at least one of the foregoing UV absorbers. When present, UV absorbers can be used in amounts of 0.0001 to 1 percent by weight, based on the weight of the polycarbonate used in the composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. When present, such materials can be used in amounts of 0.001 to 1 percent by weight, specifically 0.01 to 0.75 percent by weight, more specifically 0.1 to 0.5 percent by weight, based on the weight of the polycarbonate used in the composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. When present, antistatic agents can be used in amounts of 0.0001 to 5 percent by weight, based on the weight of the polycarbonate used in the composition.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

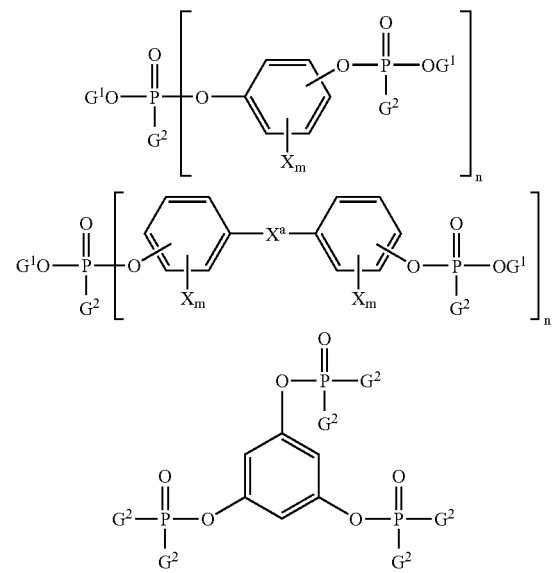

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants can be present in amounts of 0.1 to 10 percent by weight, based on the weight of the polycarbonate used in the composition.

Halogenated materials may also be used as flame retardants, for example halogenated compounds and resins of formula (18):

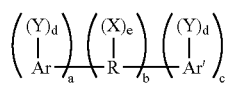

(18)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (18) are each independently mono- or polycarbocyclic aromatic groups such as phenylene, biphenylene, terphenylene, naphthylene, or the like.

Y is an organic, inorganic, or organometallic radical, for example: halogen, e.g., chlorine, bromine, iodine, fluorine; ether groups of the general formula OE, wherein E is a monovalent hydrocarbon radical similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 percent by weight, based on the weight of the polycarbonate used in the composition.

Inorganic flame retardants may also be used, for example salts of C2-16 alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 percent by weight, based on the weight of the polycarbonate used in the composition.

Radiation stabilizers may also be present, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol (pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol (hexylene glycol), 2-phenyl-2-butanol, 3-hydroxy-3-methyl-2-butanone, 2-phenyl-2-butanol, and the like, and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group (—CH$_2$OH) or it may be a member of a more complex hydrocarbon group such as would be the case with (—CR$^4$HOH) or (—CR$^4$$_2$OH) wherein R$^4$ is a complex or a simple hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, and polypropylene glycol. When present, radiation stabilizers are typically used in amounts of 0.001 to 1 wt %, more specifically 0.01 to 0.5 wt %, based on the weight of the polycarbonate used in the composition.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. When present, antidrip agents can be used in amounts of 0.1 to 5 percent by weight, based on the weight of the polycarbonate used in the composition.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like. When present, processing aids can be used in amounts of 0.001 to 1 percent by weight, based on the weight of the polycarbonate used in the composition.

The composition may be manufactured by methods generally available in the art, for example, in one embodiment, in one manner of proceeding, powdered polycarbonate, and any optional additive(s) are first blended, in a HENSCHEL-Mixer® high speed mixer. Other low shear processes including but not-limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic article comprises melt combining a polycarbonate, and any optional additive(s), to form a thermoplastic composition. The melt combining can be done by extrusion. In an embodiment, the proportions of polycarbonate, and any optional additive(s) are selected such that the optical properties of the composition are maximized while mechanical performance is at a desirable level.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded composition is quenched in water and pelletized.

Shaped, formed, or molded articles comprising the compositions are also provided. The compositions may be molded into useful shaped articles by a variety of means such as injection molding, extrusion, rotational molding, blow molding and thermoforming. In a specific embodiment, molding is done by injection molding. Desirably, the thermoplastic composition has excellent mold filling capability and is useful to form mechanical parts and automobile parts articles such as bottles, tubing, beakers, centrifuge tubes, pipettes, glucose meters, inhalers, trays, dental instruments, and the like.

In one embodiment, the composition of the disclosure is used to manufacture optical articles such as anti-glare lens, ATM screens, decorative articles, optical disk substrates, and optical fibers. Examples of the optical disk substrate pertaining to the present disclosure include substrates for a CD, CD-ROM, CD-R, opto-magnetic disk, phase changing disk, DVD-ROM, DVD-R, DVD-RAM, DVD-RW, and so forth.

The disclosure is further illustrated by the following non-limiting examples.

EXAMPLES

In the following examples, all tests were done on 2 mm color chips. Yellowness index (YI) of an article prepared from the composition may be determined according to ASTM D6166. Transmission or transmittance (T %) was measured according to ASTM D1003. Haze was measured according to ASTM D1003. Gloss was measured according to ASTM D2457. Pencil hardness and scratch hardness (anti-scratch) were measured according to ASTM D3363.

Examples 1-8

Data in Table 1-A and Table 1-B demonstrate that the properties of high light transmission in conjunction with significantly low gloss levels can be achieved in accordance with the present development, without any tooling modification or other techniques such as matte coating.

TABLE 1-A

Clear Low Gloss PC with X-PS as the Matting Agent

| | Example # | | |
|---|---|---|---|
| | #1 | #2 | #3 |
| [1]PC % | 100 | 95 | 90 |
| [2]X-PS % | | 5 | 10 |
| Transmission | 90.0 | 90.0 | 89.1 |
| Haze | 1.2 | 16.5 | 30.9 |

TABLE 1-A-continued

Clear Low Gloss PC with X-PS as the Matting Agent

| | Example # | | |
|---|---|---|---|
| | #1 | #2 | #3 |
| Gloss@60 | 159 | 77 | 55.4 |
| YI | 2.25 | 2.93 | 3.78 |

[1]PC is BPA polycarbonate resin made by a interfacial process with an Mw of 30,000, GE Plastics.
[2]X-PS is crosslinked polystyrene made by suspension polymerization, Xia-Men, JingXian, China.

TABLE 1-B

Clear Low Gloss PC with X-PS as the Matting Agent

| | Example # | | | | |
|---|---|---|---|---|---|
| | #4 | #5 | #6 | #7 | #8 |
| [1]PC % | 100 | 97.5 | 95 | 90 | 85 |
| [2]X-PS % | 0 | 2.5 | 5 | 10 | 15 |
| Gloss @ 60 | 160.3 | 114 | 86.6 | 57.3 | 42 |
| Transmission | 90.7 | 89.2 | 88 | 86 | 83.8 |
| Haze | 0.66 | 5.67 | 13.25 | 27.19 | 41.1 |
| YI | 2.09 | 3.95 | 5.54 | 8.39 | 11.7 |

[1]PC is BPA polycarbonate resin made by a interfacial process with an Mw of 30,000, GE Plastics.
[2]X-PS is crosslinked polystyrene made by suspension polymerization, Xia-Men, JingXian, China.

Examples 9-12

Influence of crosslinking level and particle size of X-PS was also studied (Table 2). Higher loading of DVB leads to higher crosslinking and lower gloss without deterioration on the transmission. From Table 2, it is apparent that a polycarbonate composition comprising X-PS with 40 um particle size exhibits slightly lower gloss than a corresponding composition comprising X-PS particles having a 6 um size. This might be due to the possibility of larger particles extending or projecting from the surface, thereby increasing the roughness.

TABLE 2

Influence of Crosslinking Level and Particle Size of X-PS

| | Example # | | | |
|---|---|---|---|---|
| | #9 | #10 | #11 | #12 |
| [1]PC | 65.00 | 60.00 | 60.00 | 60.00 |
| [2]PC | 35.00 | 35.00 | 35.00 | 35.00 |
| X-PS (6 um, 10% DVB) | | 5.00 | | |
| X-PS (6 um, 2.5% DVB) | | | 5.00 | |
| X-PS (40 um, 2.5% DVB) | | | | 5.00 |
| Gloss @ 60 degree | 152.84 | 65.40 | 78.50 | 71.84 |
| Transmission | 91.4 | 89.8 | 88.9 | 89.3 |
| YI | 1.9 | 5.4 | 9.5 | 6.8 |
| Haze | 1.1 | 31.3 | 22.6 | 25.8 |

[1]PC is Bisphenol A polycarbonate resin made by a interfacial process with an Mw of 22,000, GE Plastics.
[2]PC is Bisphenol A polycarbonate resin made by a interfacial process with an Mw of 30,000, GE Plastics.

Examples 13-16

X-PS was also loaded into another system, designated as Lexan SLX, which includes a copolymer of polycarbonate and ITR (Resorcinol Phthalate). From Table 3, it can be seen that there is no negative impact on the light transmission, but this composition leads to very high haze level. It is also evident that X-PS helps to improve the anti-scratch property of SLX. Higher loading of DVB results in more rigid particles to thereby achieve improved anti-scratch performance.

TABLE 3

X-PS in SLX system

| | Example # | | | |
|---|---|---|---|---|
| | #13 (Control) | #14 | #15 | #16 |
| [1]ITR60 | 100.00 | 100.00 | 100.00 | 100.00 |
| [2]X-PS (6 um, 10% DVB) | | 5 | | |
| [2]X-PS (6 um, 2.5% DVB) | | | 5 | |
| [2]X-PS (40 um, 2.5% DVB) | | | | 5 |
| Transmission % | 77.8 | 80 | 76.2 | 80 |
| Haze % | 6 | 97.4 | 99.8 | 95.6 |
| Gloss @ 60 | 136 | 65 | 86 | 90 |
| Anti-scratch | HB | H | F | F |

[1]ITR60 is PC-ITR copolymer made by interfacial process with 60% ITR and 40% polycarbonate, GE Plastics.
[2]X-PS is crosslinked polystyrene made by suspension polymerization, Xia-Men, JingXian, China.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A composition comprising:
(i) a polycarbonate with a refractive index α; and,
(ii) crosslinked polymer particles with a refractive index β; wherein β is within the range of about 0.98α to about 1.02α;
wherein the polymer particles with a refractive index β consist of a copolymer of at least one mono-vinyl aromatic monomer and at least one multiple-vinyl aromatic monomer,
wherein the mono-vinyl aromatic monomer is selected from the group consisting of (i) styrene, (ii) ethylvinyl-benzene, (iii) α-methyl-styrene, (iv) 1-vinyl naphthalene, (v) 2-vinyl naphthalene, (vi) vinyl toluene, (vii) methoxystyrene, (viii) t-butoxystyrene; (ix) alkyl, cycloalkyl, aryl, alkaryl, and aralkyl derivatives of (i)-(viii), in which the total number of carbon atoms in the monomer is not greater than 18; and (x) mixtures of two or more of (i)-(x); and
wherein the multiple-vinyl aromatic monomer comprises a compound having a general formula as shown below:

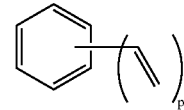

in which p is an integer from 2 to 6.

2. The composition of claim 1, in which β is within the range of from about 0.99α to about 1.01α.

3. The composition of claim 1, in which β is within the range of from about 0.995α to about 1.005α.

4. The composition of claim 1, in which the mono-vinyl aromatic monomer comprises styrene.

5. The composition of claim 1, in which the multiple-vinyl aromatic monomer comprises one or more of the following DVB isomers:

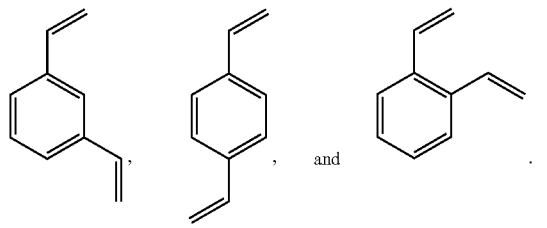

6. The composition of claim 1, in which the loading ratio of multiple-vinyl aromatic monomer ranges from about 1% to about 50%.

7. The composition of claim 1, in which the polymer particles consist of DVB crosslinked polystyrene.

8. The composition of claim 7, in which the average mean diameter of the DVB crosslinked polystyrene is within a range of from about 2 microns to about 1000 microns.

9. The composition of claim 1, in which the amount of the polymer particles is about 0.5% to about 50% by weight, based on the weight of the polycarbonate.

10. The composition of claim 1, in which the amount of the polymer particles is about 1.5% to about 40% by weight based on the weight of the polycarbonate.

11. The composition of claim 1, in which the polycarbonate comprises repeating structural carbonate units of the formula (A-1):

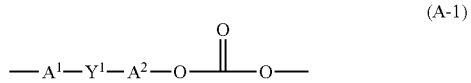

wherein each of $A^1$ and $A^2$ is a monocyclic divalent aryl radical and $Y^1$ is a bridging radical having one or two atoms that separate $A^1$ from $A^2$.

12. The composition of claim 1, in which the polycarbonate comprises repeating structural carbonate units of the formula (A-2):

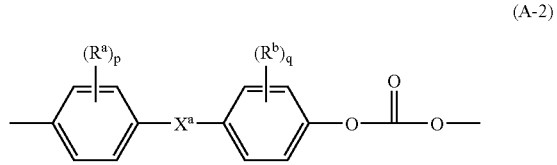

wherein $R^a$ and $R^b$ each represent a halogen atom or a monovalent hydrocarbon group and may be the same or different; p and q are each independently integers of 0 to 4; and $X^a$ represents one of the groups of formula (5):

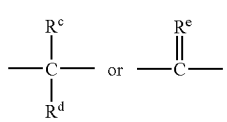

wherein $R^c$ and $R^d$ each independently represent a hydrogen atom or a monovalent linear or cyclic hydrocarbon group and $R^e$ is a divalent hydrocarbon group.

13. The composition of claim 1, in which the polycarbonate comprises repeating structural carbonate units of the formula (A-3):

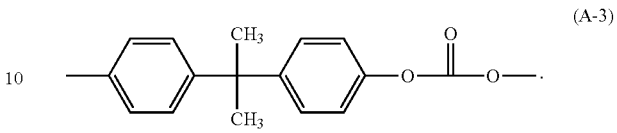

14. The composition of claim 1, in which the polycarbonate comprises repeating structural carbonate units of the formula (A-3) and (E-1):

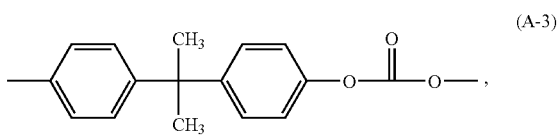

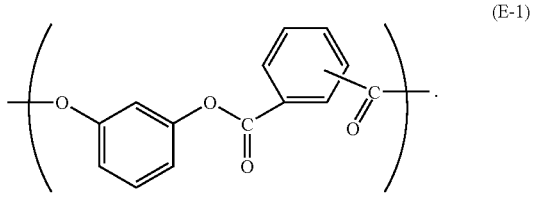

15. The composition of claim 1, in which the polycarbonate has a weight average molecular night (Mw) of from about 1500 to about 100,000.

16. The composition of claim 1, further comprising one or more optional additives selected from the group consisting of hydrolysis stabilizer, impact modifier, filler/reinforcing agent, visual effect enhancer, antioxidant heat stabilizer, light stabilizer, ultraviolet light absorber, plasticizer, mold release agent, lubricant, antistatic agent, pigment dye, flame retardant processing aid, radiation stabilizer, anti-drip agent and combinations thereof.

17. An article exhibiting a matte surface and high light transmission, which is made from the composition of claim 1.

18. The article of claim 17, which is selected from the group consisting of an anti-glare lens, an ATM screen, a decorative article, and a housing for electronic appliances.

19. The composition of claim 1, wherein the composition has a gloss of from 42 to 114, according to ASTM D2457.

20. The composition of claim 1, wherein the composition has a light transmission of from 80 to 90 percent, according to ASTM D1003, and a gloss of from 42 to 114, according to ASTM D2457.

21. A composition comprising:
(i) a polycarbonate with a refractive index α; and,
(ii) crosslinked polymer particles with a refractive index β;
wherein β is within the range of about 0.98α to about 1.02α;
wherein the polymer particles with a refractive index β consist of a copolymer of at least one mono-vinyl aromatic monomer and at least one multiple-vinyl aromatic monomer; and
wherein the composition has a light transmission of from 80 to 90 percent, according to ASTM D1003, and a gloss of from 42 to 114, according to ASTM D2457.

* * * * *